UNITED STATES PATENT OFFICE 2,199,003

DIAZO DERIVATIVES OF GUANIDYL CARBOXYLIC ACIDS

Hans Z. Lecher, Plainfield, Robert P. Parker, Somerville, and Henry Philip Orem, North Plainfield, N. J., assignors to American Cyanamid Company, New York, N. Y., a corporation of Maine No Drawing. Application December 23, 1939, Serial No. 310,819

11 Claims. (Cl. 260—140)

This invention relates to stabilized diazo compounds in which a diazotized polynuclear amine free from solubilizing groups is chemically combined with a guanidyl carboxylic acid free from azoic coupling groups. The diazo components used in the present invention will be referred to in the specification and claims as ice color diazo components because of their common use in this type of colors. Diazo compounds, diazotized amines and diazo components when referred to broadly will include compounds containing more than one diazo group or more than one amino group such as tetrazo compounds or diamines.

According to the present invention the diazotized polynuclear amines are condensed with guanidyl carboxylic acids or their alkali metal or ammonium salts in which the guanidyl group has at least one reactive hydrogen attached to a nitrogen atom and capable of reacting with a diazotized amine. The products obtained are of high stability and will not couple with ice color coupling components in alkaline medium although they may be split by acid into their original components. The products are thus useful in the printing of ice colors as they permit mixing with the coupling component in a stable alkaline printing paste without producing color and to develop the resulting print by treatment with a weak acid or acid vapors in the usual manner.

The new stabilized diazo compounds of the present invention correspond most probably to the following general formula:

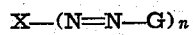

in which X is a radical of a polynuclear ice color diazo component, G is a radical of a guanidyl carboxylic acid or of its alkali metal or ammonium salt and n is 1 or 2.

It is not certain just where the azo group connects with the guanidine radical and the present invention is not limited to any particular theory of the formula of the compound. The following sample formulas are believed to correspond to the most probable structure, but it is possible that the azo group or the C=N double bond may be shifted to another nitrogen atom because of tautomerism.

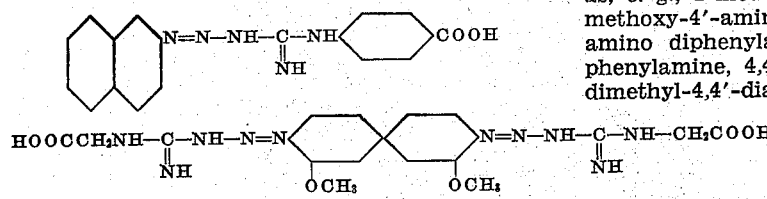

The present invention is not limited to the use of any particular guanidyl carboxylic acid. On the contrary it is generally applicable to any such compounds as long as they contain a reactive hydrogen atom attached to a nitrogen atom and capable of reacting with diazotized amines of the types referred to. Simple unsubstituted guanidyl carboxylic acids may be used such as, e. g., guanidyl acetic acid (guanyl glycine, glycocyamine), alpha guanidyl propionic acid (guanyl alanine), p-guanidyl benzoic acid. Heterocyclic guanidyl carboxylic acids such as guanyl proline or guanidyl pyridine carboxylic acid are alse useful. So are dicarboxylic acids such as guanyl glutamic acid and guanidyl phthalic acids; and guanidyl acids having both carboxylic and sulfonic groups such as guanidyl sulfobenzoic acids.

The guanidyl group itself may be substituted, creatine, e. g., being a very useful stabilizer. The radical substituting the guanidyl group or connecting the guanidyl groups with the acidic groups may be further substituted provided that the substituent does not make the radical capable of azoic coupling as hydroxyl or amino groups would do with an aromatic radical; thus 2-chloro-4-guanidyl benzoic acid may be used as stabilizer.

It is an advantage of the present invention that the new stabilized diazo compounds can be produced with practically all polynuclear ice color diazo components including the compounds having the ring systems condensed and those in which the ring systems are not condensed with each other. Typical polynuclear amines which may be diazotized or tetrazotized and reacted with guanidyl carboxylic acids are the following: amino biphenyls such as xenylamine, benzidine, o-tolidine, o-dianisidine, 3,3'-dichlorobenzidine. Alpha and beta naphthylamine, 1,5 diamino naphthalene, 2-methoxy-1-naphthylamine. Alpha amino anthraquinone. 2-amino-3-nitrofluorene and 2-amino-3-nitrofluorenone. Amino carbazoles such as 2-amino carbazole, 3,6 diamino carbazole, 2-nitro-3-amino carbazole. 2-nitro-3-amino dibenzofuran, 2-amino-3-nitro benzothiophene, 1-amino-5-fluorobenzothiazole. 4,4'-diamino stilbene. Amino diarylamines and their ether derivatives and their nitro derivatives such as, e. g., 2-methoxy-5-amino diphenylamine, 4-methoxy-4'-amino diphenylamine, 4-ethoxy-4'-amino diphenylamine, 3,4'-dinitro-4-amino diphenylamine, 4,4'-diamino diphenylamine, 2,2'-dimethyl-4,4'-diamino diphenylamine. Amino derivatives of aromatic ethers such as 2-amino diphenyl ether, 2-amino-4-acetyl diphenyl ether, benzyl-2-amino phenyl ether, 4-chloro-2-amino diphenyl ether, 4-amino-2-chloro diphenyl ether, 4-amino-4'-chloro diphenyl ether, 4,4'-dichloro-2-amino diphenyl ether, 2,2'-5'-trichloro-4-amino diphenyl ether. Mono acyl derivatives of diamines such as N-hexa hydro benzoyl p-phenylene diamine, N-hexahydro benzoyl p-toluylene diamine, N-benzoyl p-phenylene diamine, 2-benzoylamino-4-amino anisole, 2-hexahydro-benzoylamino-5-amino anisole, 2-amino-5-benzoylamino hydroquinone dimethyl ether and diethyl ether, 2-amino-5-furoyl amino hydroquinone dimethyl ether and diethyl ether and corresponding derivatives having instead of the furoyl group the radical of thiophene carboxylic acids. 2-amino-5-hexahydrobenzoylamino hydroquinone dimethyl ether and diethyl ether, 2-amino-5-phenoxyacetylamino hydroquinone diethyl ether, the monobenzyl and monophenyl urethane of 2,5 diamino hydroquinone dimethyl and diethyl ether, 1-amino-3-benzoylamino-4,6-dimethoxy benzene; analogous monoaroyl derivatives of 2,5-diamino-4-alkoxy toluenes and of 2,5-diamino-4-alkoxy chlorobenzenes and of 2,5-diamino-4-alkoxy benzene sulfo dialkylamides; analogous monoaroyl derivatives of 1,3-diamino-4,6-dimethyl benzenes; the diethyl amide of 2-amino-4-(4'-chloro-phenoxy)-benzoic acid. Mono acyl derivatives of 2-amino p-chloro phenyl ethers such as, e. g., 2-amino-4-chloro-5-acetylamino diphenyl ether, 2-benzoylamino-4-chloro-5-amino anisole. Amino derivatives of aromatic sulfones such as, e. g., 3-amino-4-methyl diphenyl sulfone, 2-amino-4'-methyl diphenyl sulfone, 2-amino-4-acetyl diphenyl sulfone, the ethyl ester of 3-amino-4-(p-toluene sulfonyl) benzoic acid, (4-methoxy-3-amino phenyl)-benzyl sulfone, 4-ethoxy-3-amino diphenyl sulfone. Amino azo compounds such as, e. g., 3,2'-dimethyl-4-amino azo benzene, 2-methyl-4-amino-5-methoxy-4'-chloro azo benzene, 4-amino-4'-nitro-3-methoxy-6-methyl azo benzene, 4-amino-4'-nitro-2,5-dimethoxy azo benzene, 4-amino-4'-chloro-3-methoxy-6-methyl azo benzene, the azo dye: diazotized o-anisidine coupled on alpha naphthylamine, 2,5-dimethoxy-4-amino-2'-ethyl carboxy-4'-nitro azo benzene, 2-acetylamino-4-amino-5-methoxy-2'-methyl sulfo-4'-nitro azo benzene. Amino derivatives of polynuclear ketones such as, e. g., 2,5-dibenzoyl aniline. Amino diphenyl methanes such as, e. g., 2-benzyl-4-chloroaniline. Amino derivatives of aryl esters of aromatic sulfonic acids such as, e. g., 2-aminobenzene sulfonic acid phenyl ester, 2-amino-4-chlorobenzene sulfonic acid p-cresyl ester. Amino xanthones.

The condensation of the diazotized amines with the guanidyl carboxylic acids is carried out in alkaline medium. The optimum pH, however, will vary to some extent with the particular diazo component and with the particular guanidine derivatives used. In general there will be an optimum pH or pH range for each pair of reaction components. In many cases an excess of the guanidine compounds is of advantage and it is possible to use an excess without a reagent waste since it can be recovered in most of the cases if desired.

Also the concentration and the temperature at which the reaction is advantageously carried out will vary with the reaction components used. However, in general it is advisable to maintain a low temperature and a low concentration.

The stabilized diazo compounds of the present invention contain a solubilizing carboxylic group and therefore most of them are soluble in aqueous alkali or in aqueous solutions of ammonia, of amines or of quaternary ammonium bases. In the case of alkali and of the strong quaternary ammonium bases, such as tetraethanol ammonium hydroxide, only an equivalent amount or a slight excess of the base is required to promote solution, while in the case of the weaker bases such as ammonia and the various amines a larger excess is required. Many stabilized diazo compounds of the present invention are also soluble in some polar organic solvents such as alcohols or acetone, particularly when such solvents contain some water.

The isolation of the stabilized diazo compounds of this invention may be effected by salting out and subsequent filtration or subsequent extraction with an organic solvent such as acetone. Through the addition of acids internal salts may be precipitated, however, the compounds are not very stable to acids and the use of weak acids may even cause some decomposition.

The compounds are for the most part yellow to brown in color. They are very stable even at elevated temperatures and are not explosive which is an important and unpredictable property since many diazo compounds present considerable explosion hazard. The good solubility in aqueous solution of bases as pointed out above is another important property and constitutes an advantage of the present invention. Another advantage of the compounds of the present invention is the stability against alkaline hydrolysis and which prevents the compounds from coupling in alkaline solution.

The compounds of the present invention are split by acids in aqueous solution and regenerate the component parts of the molecules. The ease with which the compounds are split by acid will, of course, differ with different compounds, but in most cases heating with acetic acid is sufficient to effect splitting. From the practical point of view, it is important that in this manner an ice color component can be converted into a very stable diazo compound from which, however, the diazotized amine may be easily regenerated by the aid of acids.

Because of these desirable properties the stabilized diazo compounds of the present invention can be used mixed with ice color coupling components in alkaline printing pastes and the prints can be developed with steam containing vapors of weak acids such as formic or acetic acids. When the diazo compounds of the present invention are used in the form of salts with weak and volatile amines or are dissolved by the aid of weak and volatile amines such as, e. g., diethyl ethanolamine, the development of the color may be accomplished by steam only without any additional acid because the steam removes the amine and decreases the alkalinity of the printing paste. This is also true if there is added to the printing paste a potential acidic substance which will produce an acid on steaming such as, e. g., sodium monochloroacetate, the monoacetyl ester of glycerine, ethylene monochlorohydrin, formamide, etc. Furthermore, in making up the printing paste, if insufficient amounts of base are used and some of the stabilized diazo compound and the coupling component remains undissolved, the prints may be developed with steam alone, without any addition of acid or of a potential acidic substance.

The invention will be described in conjunction with the following specific examples which are merely illustrative and are not intended to limit the scope of the invention. The parts are by weight.

Example 1

24.4 parts of o-dianisidine are dissolved in a boiling mixture of 600 parts of water and 59.5 parts of hydrochloric acid (1.19) and the solution is filtered. The solution is then cooled, iced to 0° C. and tetrazotized by the addition of 14 parts of sodium nitrite dissolved in 200 parts of water. A slight excess of sodium nitrite is added to insure complete tetrazotization. The solution so obtained is filtered. 40 parts of guanyl glycine are added and then 144 parts of 5N potassium hydroxide solution are run in. The solution is stirred 14 hours and is filtered after the addition of 96 parts of 5N potassium hydroxide solution. 70 parts of potassium carbonate per 100 parts of solution are added and the precipitated material is filtered, pressed and dried. After grinding, the product is of deep brown color and is readily soluble in water.

When this product is mixed with an equivalent amount of 2-hydroxy-3-naphthoic acid o-toluidide and this mixture made up to a printing paste in the customary manner, this paste printed on cotton and the color developed by acid steam, then a strong blue print of good fastness properties is obtained.

Example 2

12.2 parts of o-dianisidine are stirred with 66 parts of 5N hydrochloric acid and 50 parts of water. The temperature is lowered to 5° C. and the diamine is tetrazotized by a solution of 7 parts of sodium nitrite in 15 parts of water. 240 parts of tetrazo solution are obtained. 15.8 parts of creatine and then 69.8 parts of 5N sodium hydroxide solution are added. The reaction is complete in one-half hour as shown by a negative diazo test with alkaline R salt. 47.8 parts of 5N sodium hydroxide solution are added and the solution is then treated with 20 parts of sodium chloride per 100 parts of solution. The precipitated material is filtered, dried in vacuum at 45° C. After grinding the product shows a red brown color and is readily soluble in water.

When this product is mixed with an equivalent amount of 2-hydroxy-3-naphthoic acid o-toluidide and this mixture made up to a printing paste in the customary manner, this paste printed on cotton and the color developed by acid steam, then a strong blue print of good fastness properties is obtained.

Example 3

5.05 parts of o-tolidine are stirred with 25 parts of water for 30 minutes and then 29.75 parts of hydrochloric acid (1.19) are added and the stirring is continued for 30 minutes. The temperature is lowered to 0° C. and the diamine is tetrazotized by the addition of 9 parts of 35% sodium nitrite solution within about one hour. The tetrazo solution is filtered before use. 6.43 parts of guanyl glycine are added and then 85.2 parts of 5N potassium hydroxide are run in. The reaction is complete after 15 minutes as shown by a negative diazo test on spotting against alkaline R salt. The temperature is lowered to 5° C. and 50 parts of potassium carbonate per 100 parts of solution are added. The precipitated material is stirred for 15 hours and is then filtered, pressed and dried at 25° C. under vacuum. After grinding the product shows an orange-red color and is soluble in water.

When this product is mixed with an equivalent amount of 2-hydroxy-3-naphthoic acid anilide and this mixture made up to a printing paste in the customary manner, this paste printed on cotton and the color developed by acid steam, then a strong blue print of good fastness properties is obtained.

Example 4

9.2 parts of benzidine are stirred with 50 parts of water for 30 minutes and then 59.5 parts of hydrochloric acid (1.19) are added and the stirring is continued for 30 minutes. The temperature is lowered to 0° C. by the addition of ice and the diamine is tetrazotized by the addition of 7.5 parts of sodium nitrite dissolved in 30 parts of water.

The tetrazo solution so prepared is cooled to 10° C. and 19.25 parts of guanyl anthranilic acid are added. Then 151 parts of 5N potassium hydroxide solution are added and the mixture is stirred 15 hours at 15° to 20° C. The reaction is complete as shown by a negative diazo test on spotting with alkaline R salt. The precipitated material is filtered, pressed and dried at 25° C. under vacuum. After grinding the product shows an olive brown color.

When this product is mixed with an equivalent amount of 2-hydroxy-3-naphthoic acid o-phenetidide and this mixture made up to a printing paste in the customary manner, this paste printed on cotton and the color developed by acid steam, then a strong reddish violet print of good fastness properties is obtained.

What we claim is:

1. Stabilized diazo compounds having the following general formula:

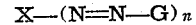

in which X is a radical of a polynuclear ice color diazo component, G is a radical included in the group consisting of guanidyl carboxylic acid radicals free from azoic coupling groups, and their alkali metal and ammonium salts and $n$ is a whole number included in the group consisting of 1 and 2.

2. Stabilized diazo compounds having the following general formula:

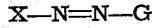

in which X is a radical of a polynuclear ice color diazo component, G is a radical included in the group consisting of guanidyl carboxylic acid radicals free from azoic coupling groups, and their alkali metal and ammonium salts.

3. Stabilized diazo compounds having the following general formula:

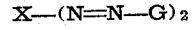

in which X is a radical of a polynuclear ice color diazo component, G is a radical included in the group consisting of guanidyl carboxylic acid radicals free from azoic coupling groups, and their alkali metal and ammonium salts.

4. Stabilized diazo compounds having the following general formula:

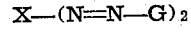

in which X is a radical of the biphenyl group and G is a radical included in the group consisting of guanidyl carboxylic acid radicals free from azoic coupling groups, and their alkali metal and ammonium salts.

5. Stabilized diazo compounds having the following general formula:

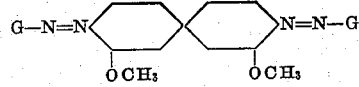

in which G is a radical included in the group consisting of guanidyl carboxylic acid radicals free from azoic coupling groups, and their alkali metal and ammonium salts.

6. A stabilized diazo compound having the following formula:

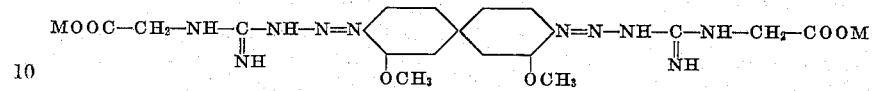

in which M represents a member of the group consisting of hydrogen, alkali metals or ammonium radicals.

7. A stabilized diazo compound having the following formula:

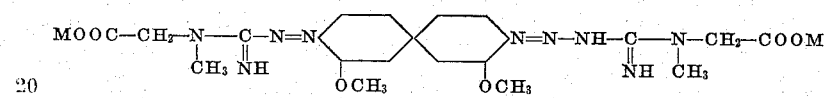

in which M represents a member of the group consisting of hydrogen, alkali metals or ammonium radicals.

8. A process of producing stabilized diazo compounds which comprises reacting diazotized polynuclear ice color components with guanidyl carboxylic acids free from azoic coupling groups, in alkaline medium.

9. A process of producing stabilized diazo compounds which comprises reacting tetrazo compounds belonging to the biphenyl group with guanidyl carboxylic acids free from azoic coupling groups, in alkaline medium.

10. A process for producing stabilized diazo compounds which comprises reacting tetrazotized o-dianisidine with guanyl glycine in alkaline medium.

11. A process for producing stabilized diazo compounds which comprises reacting tetrazotized o-dianisidine with creatine in alkaline medium.

HANS Z. LECHER.
ROBERT P. PARKER.
HENRY PHILIP OREM.